United States Patent [19]

Parker

[11] 4,276,481
[45] Jun. 30, 1981

[54] FLUID VELOCITY ACTUATED STRUCTURE FOR A WIND MILL/WATER WHEEL

[76] Inventor: Denson Parker, 4570 Westport Rd., Apartment 8, Columbus, Ohio 43228

[21] Appl. No.: 3,614

[22] Filed: Mar. 12, 1979

[51] Int. Cl.³ ............................................... F03B 7/00
[52] U.S. Cl. ...................................... 290/43; 290/54; 416/197 A
[58] Field of Search ........................ 290/43, 44, 52, 54, 290/55; 415/8, 10; 416/3, 17, 23, 24, 32, 117, 142, 149, 159, 166 R, 197 R, 197 A, 197 B

[56] References Cited

U.S. PATENT DOCUMENTS

| | | | |
|---|---|---|---|
| 1,377,719 | 5/1921 | Morris | 416/149 X |
| 1,505,909 | 8/1924 | Melin et al. | 416/149 |
| 1,602,280 | 10/1926 | Melin et al. | 416/149 |
| 3,271,005 | 9/1966 | Jones | 416/32 X |
| 3,952,723 | 4/1976 | Browning | 290/54 X |
| 3,976,396 | 8/1976 | Antogini | 416/117 X |
| 4,134,023 | 1/1979 | Salter | 290/43 X |

FOREIGN PATENT DOCUMENTS 1452483  10/1976  United Kingdom ........................ 415/8

Primary Examiner—S. J. Witkowski
Assistant Examiner—W. E. Duncanson, Jr.
Attorney, Agent, or Firm—Anthony D. Cennamo

[57] ABSTRACT

A fluid velocity actuated structure for a wind mill/water wheel, comprising an elongated cylinder with blades/fins hingedly supported thereon. When exposed to the driving force the one blade/fin will respond by assuming a position of least resistance thereto whereas the 180° opposite blade/fin will assume a position of maximum resistance thereto. The hinge supports for the fins/blades has a swivel structure to permit resiliency in the cylinder to the fluid medium. From the rotating structure there is provided coupling means for converting the rotational force into electrical power. In use as a water wheel in a liquid stream, the cylinder has pump means associated there-with to adjust the depth of the structure in the fluid stream. When said structure is utilized as a wind mill, the cylinder is preferably upright and supported on a base. Within the base are a series of magnets that when electrically actuated, brakes the rotation of the cylinder. An electrical feedback system from the power source to the magnetic fields controls the magnetic force in a manner directly proportional to the wind velocity. Specific refinements and operational features are disclosed.

10 Claims, 15 Drawing Figures

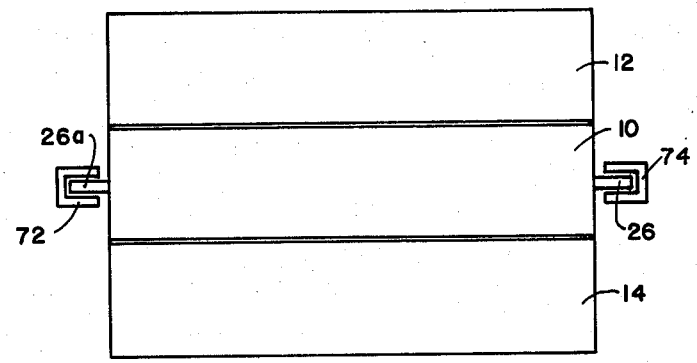
FIG. 7
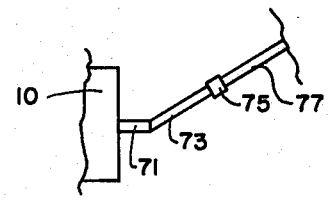
FIG. 7C
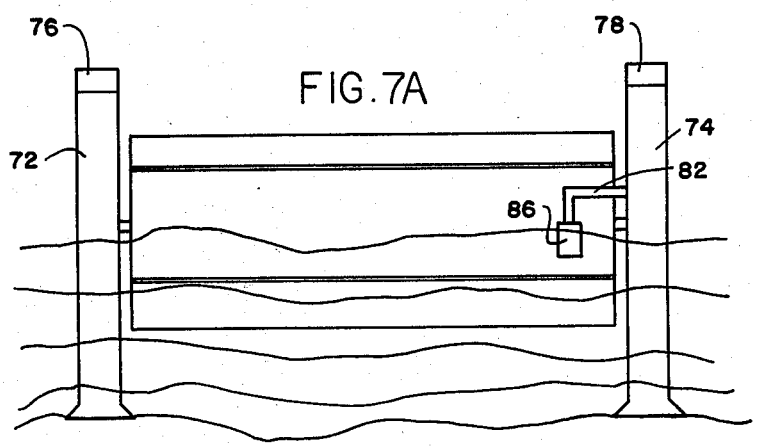
FIG. 7A
FIG. 7B
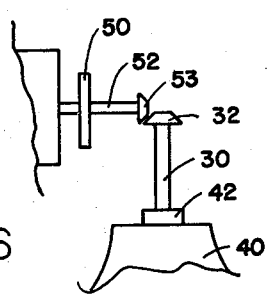
FIG. 6
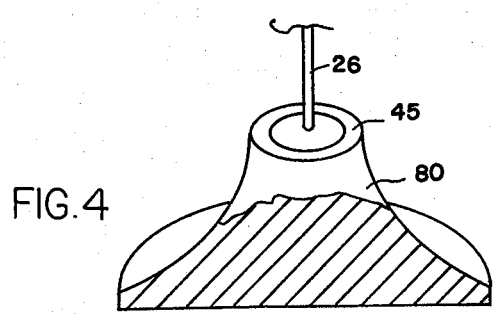
FIG. 4
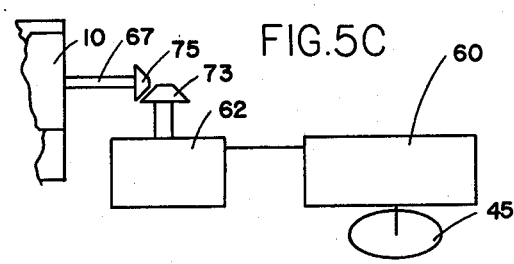
FIG. 5C

FLUID VELOCITY ACTUATED STRUCTURE FOR A WIND MILL/WATER WHEEL

PRIOR ART AND BACKGROUND

The prior art is replete with wind mill structures and water wheel structures actuated by a fluid stream to generate electrical power. The attendant disadvantages of the prior art are many; but, principally, the designs are either oversimplified or overcumbersome. That is, to utilize a very high velocity fluid stream the structure is vulnerable to destruction, and mechanical rotation is an overpowering electrical energy source.

In this respect the structure of the prior art has included cup-like blades to receive the maximum force of the fluid medium. Also the prior art has utilized the retractable blade to present a minimum of counter-impedance from the back side of the rotating mechanism to the medium flow.

Again other structures known in the art have incorporated therein mechanical brakes to neutralize the high velocity fluids. However the resulting structures are complex.

Again, in many liquid fluid streams the maximum flow may not be on the surface, i.e. the sub-surface. Accordingly, a water wheel operative from the surface of the fluid stream may not be operative from the maximum flow. In other instances an underground stream may be utilized to which a surface wheel would not be adaptable.

SUMMARY OF INVENTION

The wind mill/water wheel electrical generator mechanical rotating force of the invention comprises an elongated cylinder having hingedly supported therein two or more blades/fins. The hinge is a swivel joint to permit adjustment to the varying directions of the fluid stream. The blades/fins are semi-circular and when retracted conform to the outside curvature of the cylinder. The upper portion of the blade/fin has a cap to utilize the up and down crossdirection fluid flow. The cap portion of the blade/fin fits over the end of the cylinder when in a retracted position. The blade/fin opens to a position for interception of the air flow; wherein the oppositely swivel hinged blade/fin has its back side to the air flow causing it to conform to the outside of the cylinder. From the rotation of the cylinder an electrical generator is driven.

In use as a wind mill generator, the cylinder is preferably positioned upright on a base having electro-magnets incorporated adjacent the interface surfaces. An electrical feedback system between the generator and the magnets limits the maximum rotation of the cylinder by controlling the magnetic force in a manner that is directly proportional to the wind velocity. An alternative embodiment for a horizontally positioned cylinder also is disclosed.

In use as a water wheel electrical generator, the cylinder includes pump means for submerging the entire structure in a liquid fluid medium to a depth of maximum liquid flow velocity. Structural improvements to an operable embodiment and features are disclosed.

OBJECTS

It is accordingly a principal object of the present invention to provide a structure rotatable in response to a fluid stream to provide a mechanical force that may be converted into electrical power.

A further object of the invention is to provide such a structure that may be utilized either in a liquid or air fluid stream.

Another object of the invention is to provide such a structure that has the least counter-resistance to the fluid stream, but yet may be adjusted to provide a brake in a high velocity stream.

Still another object of the present invention is to provide such a structure that is simplified in design and has minimum wear surfaces.

Other objects and features of the present invention will become apparent from a reading of the following detailed description when taken in conjunction with the drawings in which:

BRIEF DESCRIPTION OF DRAWINGS

FIG. 4 is a perspective view of the base per se for the cylinder.

FIG. 5C illustrates in block schematic the mechanical/electrical feedback system to the base of the structure.

FIG. 6 illustrates an alternative arrangement of the preferred embodiment for use as a wind mill electrical generator.

FIG. 7 illustrates in a top view the structure for submerged utilization; FIG. 7A is a side view of FIG. 7.

FIG. 7B is the mechanical/electrical coupling means.

FIG. 7C is the gear arrangement for maintaining the cylinder in position.

DETAILED DESCRIPTION OF DRAWINGS

Figure 1:
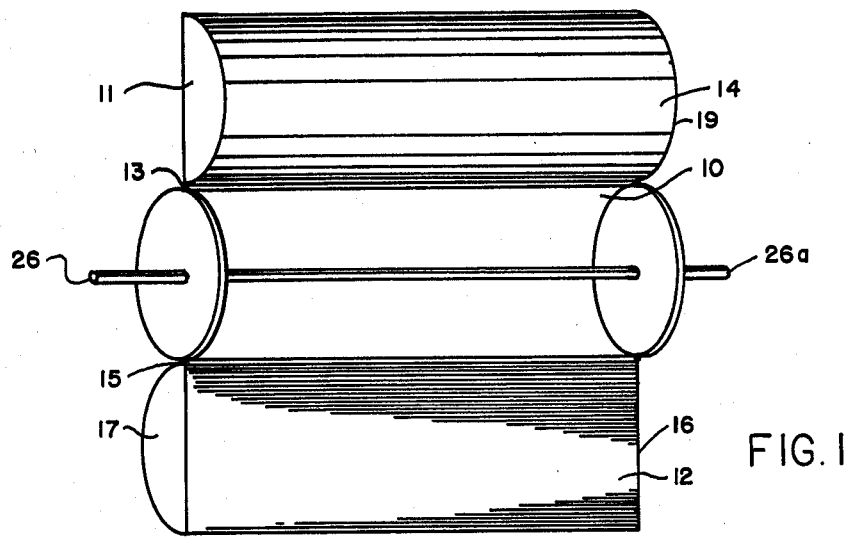
FIG. 1 is an overall view of the basic structure of the preferred embodiment.

With particular reference to FIG. 1 there is illustrated perspectively the present invention in its most simplified embodiment. The cylinder 10 rotates about or with shaft 26 either vertically or horizontally. Hingedly supported by hinge 13 on one side of cylinder 10 is blade/fin 12 whereas, on the opposite side of cylinder 10 there is hingedly supported by hinge 15 the blade/fin 14.

Although FIG. 1 illustrates but two blade/fins it is, of course, deemed a matter of choice to have more than two blade/fins.

The upper portion of blade/fins 12 and 14 are capped at 11 and 17. It can be seen that when utilized as a wind mill the caps 11 and 17 intercept the flow of air. This is particularly adaptable to a cross up/down fluid stream.

With the fluid stream in the direction of the arrow, the blade/fin 12 will intercept the fluid flow whereas the blade/fin 14 (together with cylinder 10) will permit the air to pass over. That is blade/fin 12 causes the cylinder 10 to rotate whereas the blade/fin 14 offers no resistance to rotation of the cylinder 10. As the cylinder rotates the blade/fins 12 and 14 will exchange positions as well as their effect on rotation on cylinder 10.

The present invention is adaptable to utilize the maximum flow action of blade/fin 12 but eliminate the counter-resistance of the blade/fin 14. This is accomplished primarily by having blade/fins 12 and 14 hinged to the cylinder 10 on opposite sides. The hinges 13 and 15 permit the blade/fins 12 and 14 to rotate ¼ of one rotation.

Figure 2A:
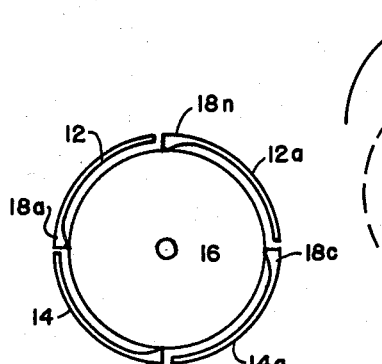
FIG. 2A is a top view illustrating the fins in a closed position and FIG. 2B is an alternative embodiment illustrating the fins in a closed position.

With continued reference to FIG. 1, and now also FIGS. 2A, B, C, there is illustrated the elimination of the counter-resistance blade/fin. As can be seen from FIGS. 2A, B, and C, the hinge support permits the blade/fin 12 to swing open when in direction of the wind and blade/fin 14 to close when opposite the direction of the wind. The blade fins are of a rugged construction and balanced relative to their pivot point on the hinges.

FIGS. 2A and B depict in this instance, the blade/fin to be closed adjacent the wall of cylinder 10. That is blade/fins 12, 12a and 14 and 14a are, from the bottom view of FIG. 2A adjacent the cylinder 10. In the top view of FIG. 2B it is seen the caps 11 and 11a and 17 and 17a of the blade/fins overlap the cylinder 10.

Figure 2C:
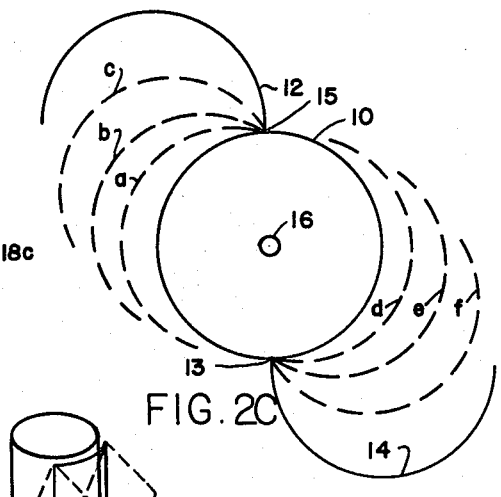
FIG. 2C is a top view illustrating the fins varying from full closed to full open in accordance with the operation of the preferred embodiment.

With particular reference now to FIG. 2C there is illustrated the operation of the blade/fins 12, 12a and 14 and 14a. Initially, when the invention is utilized in a fluid stream and the flow is maintained in a single direction, the blade/fins utilize the forces of gravity, upon rotation of the cylinder 10.

As can be seen in FIG. 2C the rotation of cylinder 10 is in the direction of the curved arrow—that is, responsive to the direction of medium flow. Taking a single blade/fin 14, its weight will cause it to follow the contour of the cylinder 10. As the rotation progresses blade/fin 14 will assume the position of blade 14a—continuing to be adjacent the cylinder 10. It can be appreciated that at this point in rotation blade/fins 14 and 14a will offer very little resistance to the rotation of cylinder 10. That is the fluid stream will pass over these blade/fins much in the same manner as it would over the cylinder 10, itself.

As the rotation of the cylinder 10 progresses beyond its shown position, blade/fin 14a will open in a sequence shown by the dotted lines. The pivot point 15 shown in FIG. 2C is at the dead spot relative to the force of gravity. To the left the force will cause the blade/fin to adhere to the contour of cylinder 10 whereas on the other (right) the force will cause it to fall open.

With cylinder 10 rotating as shown the blade/fin 14a will assume the full closed to full open position as shown by the dotted lines b, c, d, and e, between blade/fins 14a and 12. That is, as the weight of the blade/fin pivot point 15 shifts from the left to right the blade/fin 14a will begin to open. It is appreciated that as the blade begins to open it will also receive the force of the fluid flow—causing the blade/fin to open more rapidly and positively than with the gravitational forces only.

Similarly, as the pivot point 13 progresses beyond the lower region and then upward, the fluid flow will be shielded by the cylinder 10 and hence will not hinder the blade from closing.

In an upright position as well as the horizontal, whether in an air or liquid stream the rotation of the cylinder 10 will cause the blade/fins 14 and 14a to assume a position adjacent the cylinder 10.

If the blade/fins are of light weight material the gravitational force will be minimal. In this instance the opening and closing of the blades is almost entirely related to a direction of the fluid flow.

Figure 3A:
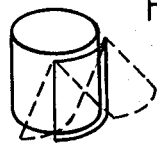
FIG. 3A illustrates the overall structure of the swivel hinge from one position to another.
Figure 3:
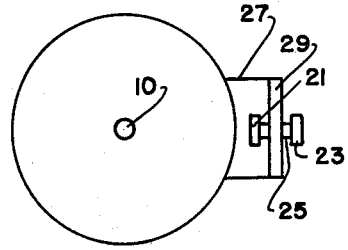
FIG. 3 illustrates in a top view the structural schematic of the swivel hinge between the fin and the cylinder.

With reference to FIGS. 3, 3A, and 3C there is shown in an exploded view the hinge 15 (the other hinges being identical). Any up drafts can aid rotation and create a lift from the base thereby reducing the effect of weight resistance between 10 and base 40. The hinge basically comprises a swivel to permit leaway in the back and forth movement of the hinge as shown in FIGS. 3 and 3A. The fixed portion of the hinge on the cylinder 10 comprises crosspiece 27 and front piece 29 to support the movable portion attached to the blade. This movable portion comprises securing pieces 21 and 23 joined by the crosspiece 25. In this way the restriction normally encountered by a hinge is eliminated. That is in simple terms the hinge 15 permits slop to occur thereby adjusting the blade to a crossdirection fluid as shown in FIG. 3C.

As shown in FIGS. 2 and 2C, adjacent the hinge point, the blade/fins include a pivotal stop. The purpose of this stop 18—is to restrict the blade/fins to no more than full open. Otherwise the blade/fins will swing down and the fluid stream would tend to pass by. The particular structure shown relative to this stop is a matter of choice and may take alternate forms to achieve the result.

It had been found that the cylinder support for the blades that in the cylinder 10 per se provides an additional feature over that of the simple rod support. More specifically, the hollow cylinder 10 upon rotation, assumes a fly-wheel effect and accordingly sustains and enhances rotation. Further with the blades retracted to the contour of the cylinder the fly-wheel effect by the additional weight of the blades is increased. In this way, the retracted blades not only do not provide a counter-resistance but actually adds a rotational force.

The basic structure of the preferred embodiment is utilized in a further specific embodiment particularly adaptable to a liquid stream. With reference to FIGS. 7, 7A, 7B and 7C this embodiment is illustrated. The operation of the rotation of the cylinder 10 and the blades 12 and 14 is that illustrated relative to FIG. 2, however, in this instance, the structure is submerged horizontally in the liquid stream.

A pair of U-shaped guides 72 and 74 position the cylinder within the stream. That is rods 26 and 26a ride within the U-shaped structures 72 and 74. The movement of cylinder 10 is thereby restricted to up and down motion. Caps 76 and 78 on rods 26 and 26a assure the cylinder 10 is retained therein.

To position the rotating cylinder 10 either up or down within the liquid fluid stream 70 a submergible pump 86 is incorporated within the cylinder 10. Simply, to cause the cylinder 10 to submerge in the liquid stream, water is pumped in. To cause the cylinder 10 to rise in the liquid stream the water in the cylinder is pumped out. To assure the cylinder 10 is retained in its selected position there is provided a gear-like arrangement between shaft 26 at 63 and structure 74 at 65 as shown in FIG. 7C. Alternatively, the pump etc. can be eliminated and the depth of the cylinder 10 controlled by the gear arrangement.

With reference to FIG. 7B the mechanical joining means between the cylinder 10 and the electrical generator is illustrated for the cylinder moving up or down within the stream. A series of swivel joints permits the same rotation irrespectively of the position of the cylinder 10.

The embodiment of FIG. 7 is particularly adaptable to deep water streams wherein the liquid velocity varies in depth. In these instances a surface wheel is not desireable. Further, in an underground stream it may be necessary that the cylinder 10 be submerged.

The structure in an air stream may assume either the horizontal as shown in FIG. 6 or vertical, as shown in FIG. 4, position. In the first embodiment with reference to FIG. 4, the cylinder 10 positioned vertically upon support rod 26 is fixedly positioned upright on support base 80. In this position it is preferred that the blades 12 and 14 comprise a light weight material as there would be no gravitational pull. In this vertical position the operability of the structure is the same irrespective of the direction of the air stream. That is in a first direction the one set of blades will be open and the others closed; whereas, in the second direction the open and closed blades are reversed.

Figure 2B:
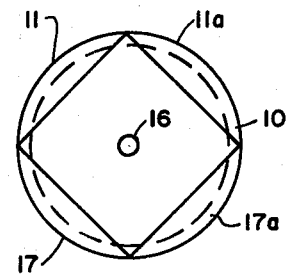

The engaging gear 32 together with rod 52 and bearings 50 supports the cylinder in the horizontal position. The rotational operation is as shown in FIGS. 2A, 2B, and 2C. In that an air stream the fluid flow is not in a fixed direction, to make the embodiment of FIG. 6 operable for all air flow directions, the supporting rod 30 is rotationally fixed by bearings 42 to the base 40. The gear arrangement of gears 53 and 32 permits the right angle movement.

As stated above, it is desirable in a wind mill type of electric generator, that the construction be sufficiently fluid to cause and sustain rotation with even the slightest wind velocity. It is also known that such structures do present problems with high wind velocity. Accordingly, the low wind features must be retained without the attendant disadvantages of high wind velocity.

Figure 5B:
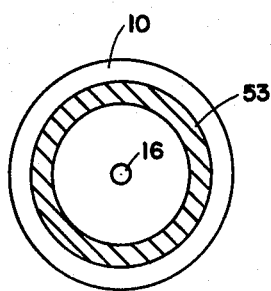
FIG. 5B illustrates magnetic response means in the bottom of the cylinder.
Figure 5A:
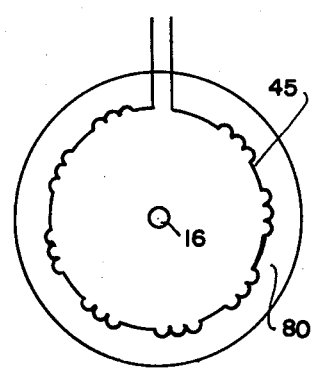
FIG. 5A illustrates schematically in a top view the magnetic power field in the top of the base of FIG. 4.

In this respect, the preferred embodiment further includes a magnetic brake. There is illustrated in FIG. 5A an electro-magnetic ring 45 in the base 40. This ring is of a flat or plane surface. On the underside of the cylinder 10 as there is shown in FIG. 5B, there is positioned a magnetic ring 53. This ring is of the permanent magnet material. To permit rotation without functional retardation, the interfaces of the cylinder 10 and the base 40 is separated by a collar 45, (FIG. 4). This collar is on two parts one positioned on the rod 30 and the other on the base 40 a bearing 42 for rotation joins the two as shown in FIG. 6.

With reference to FIG. 5C a schematic illustration may be a bod of a typical mechanical/electrical velocity inverse feedback system. The shaft 67 through couplings 75 and 73 drive an electrical power generator during driving periods of low or normal wind velocity the inverse feedback 60 circuit is quiescent. Upon the wind attaining a high velocity, the inverse feedback circuit 60 becomes operative. A voltage divider, such as a reohstate, is put into operation. As the wind velocity increases the voltage output of the inverse feedback circuit increases.

The output voltage of inverse feedback 60 is applied to the electrical coils 45 surrounding the metallic ring 47 thereby creating an electrical magnetic force. This force is in opposition to the direction of the magnetic field of the permanent magnet 53 of FIG. 5B. It can be seen then that the rotation of cylinder 10 is controlled in its maximum rotation.

I claim:

1. A fluid actuated structure for a wind mill/water wheel comprising:
   an elongated cylinder positioned on a rotational shaft a plurality of blades hingedly supported on said cylinder and wherein said blades are curved to follow the contour of said cylinder to assume a position of maximum and minimum resistance to the fluid flow,
   said hinge support having a swivel structure to permit resiliency of the cylinder to the fluid flow,
   means for altering said cylinder relative to the direction of flow of said fluid,
   means for converting the rotation of said cylinder, in response to said fluid flow, to useful energy, and means for providing a feedback control to said cylinder to adjust the rotation of said cylinder directly proportional to the velocity of the fluid flow.

2. The structure of claim 1 wherein said cylinder and blades further comprises means for maintaining said cylinder in a horizontal position in a liquid medium.

3. The structure of claim 2 wherein said means for maintaining said cylinder in a horizontal position further comprises means for varying the horizontal position of said cylinder relative to said fluid medium.

4. The structure of claim 2 wherein said last named positioning means comprises a water pump to fill said cylinder with water to cause it to submerge to a controlled depth in the liquid fluid means.

5. The structure of claim 2 wherein said last named positioning means comprises structural upright supports for said cylinder, means for maintaining the position of said cylinder in said supports, and means for varying the depth of said maintaining means in the liquid fluid medium.

6. The structure of claim 1 wherein said blade fins are curved to follow the contour of said cylinder and further comprise a cap at both ends thereof so that when in a closed position said blades completely engulf said cylinder.

7. The structure of claim 1 wherein said means for converting said rotation of said cylinder to useful energy comprises an electrical generator responsive to the velocity of said rotation.

8. The structure of claim 6 wherein said feedback control comprises a base for said cylinder, an electrical magnetic means in said base, and a magnetic responsive means in said cylinder adjacent to said base, and means connecting said feedback control means to said electrical magnet.

9. The structure of claim 1 further comprising stop means adjacent said hinges to control the effect of said fluid stream on the maximum resistance thereto.

10. The structure of claim 1 wherein said means for converting the rotation of said cylinder to useful energy further comprises coupling said rotational shaft to a utility generator and wherein said coupling means further comprises swivel joints.

* * * * *